United States Patent
Nalawadi et al.

(10) Patent No.: US 7,325,146 B2
(45) Date of Patent: Jan. 29, 2008

(54) METHOD AND APPARATUS FOR GENERATING SMI FROM ACPI ASL CONTROL CODE TO EXECUTE COMPLEX TASKS

(75) Inventors: Rajeev K. Nalawadi, Folsom, CA (US); Fred H. Bolay, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 10/039,054

(22) Filed: Dec. 31, 2001

(65) Prior Publication Data

US 2003/0135534 A1 Jul. 17, 2003

(51) Int. Cl.
*G06F 1/00* (2006.01)
(52) U.S. Cl. .................. 713/300; 713/310
(58) Field of Classification Search ........... 713/300, 713/310
See application file for complete search history.

(56) References Cited

U.S. PATENT DOCUMENTS

| | | | | |
|---|---|---|---|---|
| 5,530,891 A | * | 6/1996 | Gephardt | 710/8 |
| 6,122,748 A | * | 9/2000 | Hobson | 713/323 |
| 6,185,677 B1 | * | 2/2001 | Nijhawan | 713/2 |
| 6,212,592 B1 | * | 4/2001 | Klein | 710/260 |
| 6,219,742 B1 | * | 4/2001 | Stanley | 710/260 |
| 6,282,601 B1 | * | 8/2001 | Goodman et al. | 710/260 |
| 6,321,289 B1 | * | 11/2001 | Engfer et al. | 710/260 |
| 6,775,728 B2 | * | 8/2004 | Zimmer et al. | 710/260 |
| 6,792,491 B2 | * | 9/2004 | Cooper | 710/260 |
| 6,895,517 B2 | * | 5/2005 | Wang | 713/300 |

OTHER PUBLICATIONS

Compaq Computer Corporation et al., "Advanced Configuration and Power Interface Specification", Jul. 27, 2000, Compaq Computer Corporation et al., Revision 2.0, pp. 50, 51, 69.*
Intel Corp., "Intel's SL Enhanced Intel486 Microprocessor Family", Jun. 1993.*

* cited by examiner

*Primary Examiner*—Thomas Lee
*Assistant Examiner*—Ji H Bae
(74) *Attorney, Agent, or Firm*—Molly A. McCall

(57) ABSTRACT

Embodiments of the present invention provide for generation of SMI from ACPI ASL control method code to execute complex tasks including, but not limited to, transferring or searching through large amounts of data dynamically. Instead of executing certain tasks using limited ASL functionality, an SMI is generated in an ASL code execution path to enable usage of a CPU instruction set accessible to the SMM handler. In particular, an ACPI operation region is defined for an I/O address location capable of triggering an SMI. An ACPI control method accesses the SMI generation I/O address location to generate an SMI during ASL code execution when a predefined complex task is encountered, thus enabling the SMI handler code to advantageously execute the complex task.

15 Claims, 3 Drawing Sheets

METHOD AND APPARATUS FOR GENERATING SMI FROM ACPI ASL CONTROL CODE TO EXECUTE COMPLEX TASKS

BACKGROUND

1. Field

The present invention relates generally to computer systems and more particularly microprocessor based computer systems.

2. Background Information

Advanced Configuration and Power Interface (ACPI) is an extensible tool by which the operating system (OS) can be given greater control over power and resource management functions in computer systems, such as personal computers. ACPI provides a hardware and software interface by which an OS can manipulate the characteristics of motherboard devices. This technology differs from existing Basic Input/Output System ("BIOS") technologies in at least two regards: (i) the BIOS support code is written in p-code called ACPI Machine Language ("AML"), rather than in the native assembly language of a platform; and (ii) the BIOS support code does not determine the policies of time-outs for power or resource management. Rather, these policies are determined by the operating system.

The ACPI hardware interface provides functionality to the OS in (i) control/detection of system control tasks using a normal interrupt called System Control Interrupt ("SCI"), rather than a System Management Interrupt ("SMI"), and (ii) control of the system power state. The details of a platform's support for the hardware interface are provided in a set of well-defined tables within the system BIOS. The ACPI software interface provides the means for the OS to find the different ACPI related tables in the system BIOS and means for the OS to understand and control the characteristics of the motherboard using AML. AML resides in the tables within the system BIOS. ACPI source language (ASL) is the preferred source language for writing ACPI control methods. Most OEMS and BIOS developers write control methods in ASL. A translation tool translates ASL code to AML code versions of the control methods.

AML is the ACPI control method virtual machine language, i.e., a machine code for a virtual machine that is supported by an ACPI-compatible OS. It is a pseudo-code assembly language that is interpreted by an OS driver. AML is the language processed by the ACPI method interpreter. It is primarily a declarative language and provides a set of declarations that is compiled by the ACPI interpreter into the ACPI name space at definition block load time. However, AML's access to memory, I/O and PCI configuration space is either static or the capabilities provided for dynamic values are so limited as to be useless in may situations. It is thus very difficult for code developers to develop optimal code that can execute fast and hence positively affect performance.

What is needed therefore is a method and apparatus for controlling code execution in a mode where a whole range of native CPU instructions can be executed.

DETAILED DESCRIPTION

In the following description, numerous specific details are set forth such as specific memory configurations, address ranges, protection schemes, etc., in order to provide a more thorough understanding of the present invention. It will be apparent, however, to one skilled in the art, that the present invention may be practiced without these specific details. In other instances, well known apparatus and process steps have not been described in detail in order to avoid obscuring the invention.

Embodiments of the present invention provide for generation of SMI from ACPI ASL control method code to execute complex tasks including, but not limited to, transferring or searching through large amounts of data dynamically. Instead of executing certain tasks using limited ASL functionality, a SMI is generated in an ASL code execution path to enable usage of a flexible native central processor unit (CPU) instruction set accessible to a system management mode (SMM) handler. In particular, an operation region is defined for a SMI generation I/O register. The Pre-OS software configures the chipset to generate an SMI when an I/O access occurs to this particular address location defined through the ACPI Operation Region. An ACPI control method execution by any OS entity accesses the SMI generation I/O register to generate an SMI during ASL code execution when a predefined complex task is encountered, thus enabling the SMI handler code to advantageously execute the complex task.

Figure 1:
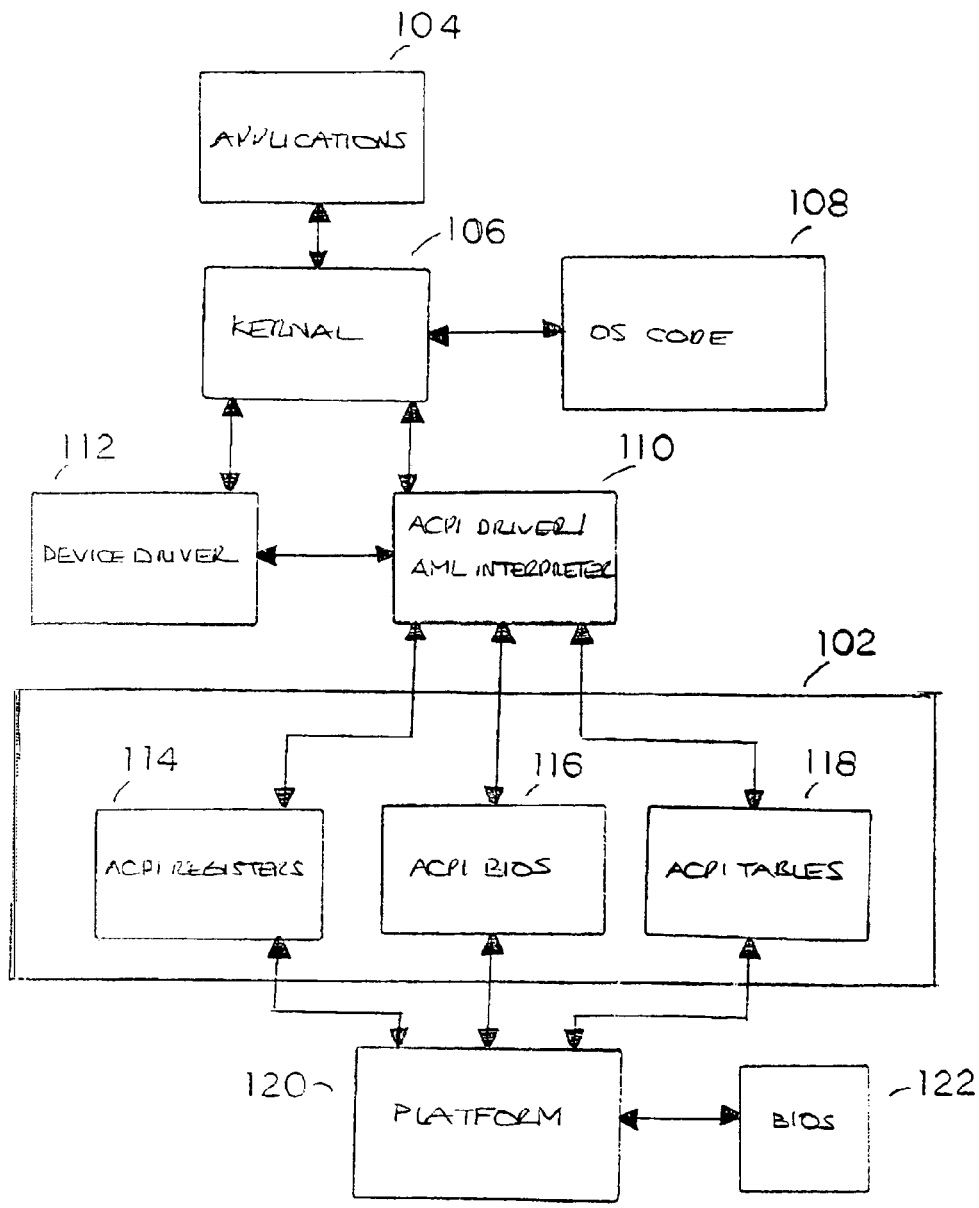
FIG. 1 illustrates a functional block diagram of an embodiment of an exemplary computer system embodying the present invention.

FIG. 1 illustrates a functional block diagram of an embodiment 100 of an exemplary computer system implementing an ACPI system 102. AML is a virtual machine language, compiled from ASL, in which device control methods are written, and which is understandable to all ACPI-compatible operating systems. Device control methods are typically written by device manufacturers and provided to platform developers and manufacturers.

Operating system dependent software applications 104 run on a system interface, through kernel 106 with operating system control code 108 and ACPI driver/machine language interpreter 110. Operating system control code 108 and ACPI driver/machine language interpreter 110 operate in software within microprocessor (not shown), and are operating system specific. Kernel 106 also interfaces with device driver 112, also running in software on the microprocessor.

Through ACPI driver/machine language interpreter 110, software interfaces with ACPI registers 114, ACPI Basic Input Output System (BIOS) 116, and ACPI tables 118, to platform hardware 120 and, through platform hardware 120, to system BIOS 122. ACPI machine language (AML) is a machine language capable of interfacing between any ACPI aware operating system and any system Basic Input Output System function. ACPI is intended to interface between hardware and software, though the requirements of the ACPI environment may be viewed in many respects as a hardware specification.

Device driver 112 allows interface with the platform hardware. ACPI tables 118 describe the interface to the hardware. Although some controls are embedded in fixed blocks of registers, ACPI tables 118 specify the addresses of the register blocks. When the operating system executes p-code, ACPI tables 116 can be accessed.

Figure 2:
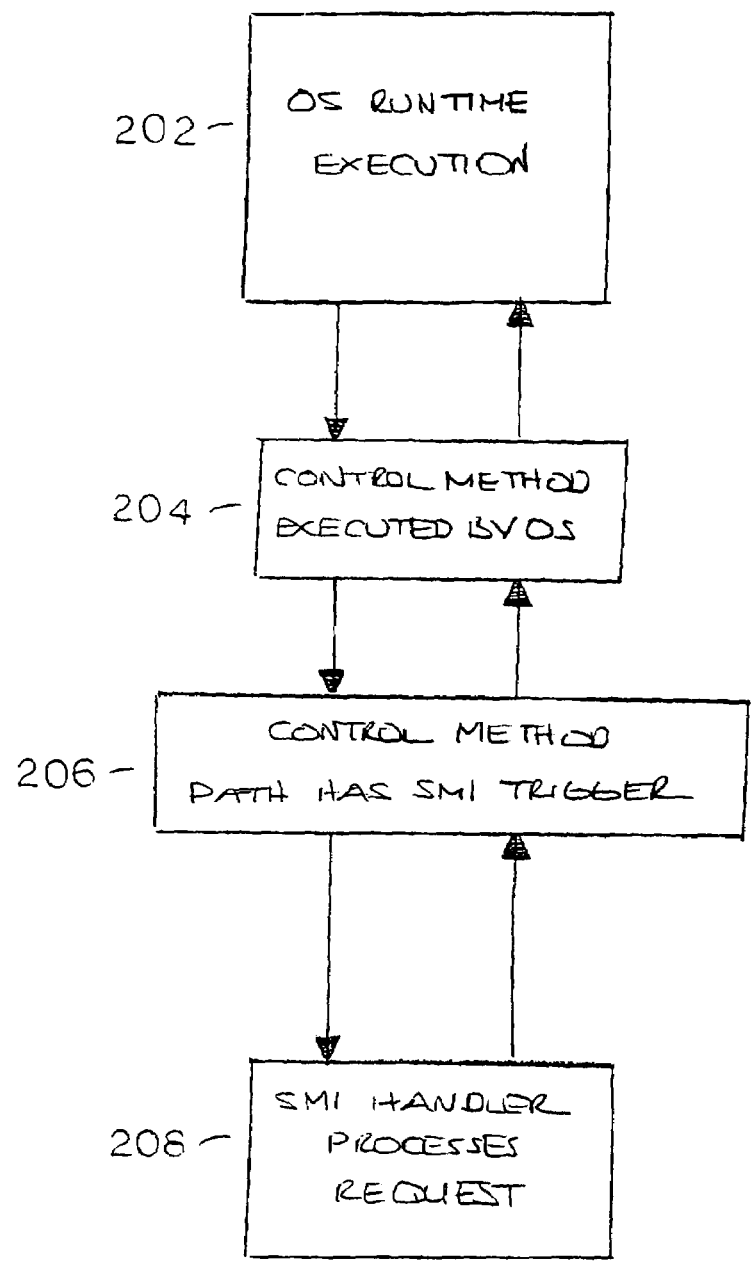
FIG. 2 illustrates an embodiment of a process for enabling a control method executed by the operating system to invoke a SMI from within ACPI code after a complex task has been detected.

FIG. 2 illustrates an embodiment of a process for enabling a control method executed by the operating system to invoke a SMI from within ACPI code after a complex task has been detected. When the OS identifies an ACPI related activity that needs to be executed on behalf of some device/driver entity, the task is routed and targeted to the appropriate components of the OS ACPI driver. Under OS runtime execution (step 202), ACPI driver 110 queues control methods to handle each task (step 204). In particular, the ACPI driver 110 accesses the control method and device driver of the device. Unlike conventional interrupt-handling ACPI-compatible hardware that relies on the AML code to process all such tasks, the present invention detects tasks that are more suitably processed by SMI handler code based on the particular tasks detected in the tasks registers. In an ACPI environment, such transfers are within the management control of the operating system, yet the AML code limitations affect efficient execution of certain complex tasks.

Complex tasks suitable for the SMI handler include, but are not limited to, handling and transferring large amounts of data that has to be gathered dynamically during runtime, saving and restoring devices coming out of suspend state, determining device standards, accessing features not accessible to the ASL code and so forth. Complex tasks requiring transfer or search of large bodies of data are particularly problematic, since the AML access to memory, I/O and PCI configuration space is either static or else the capabilities provided for dynamic values are so limited as to be largely useless. This makes it difficult for code developers to develop optimal code that can execute fast and hence positively affect performance. In a typical implementation, ROM images need to be copied from a flash component to memory area. A SMI is generated by the control code and a SMI handler correspondingly copies the flash component to the memory area. After the task is completed, control is transferred back to ASL code. One skilled in the art will recognize that embodiments of the present invention can be configured to allow the control method to generate an SMI interrupt and consequently enable SMI handler code to handle any kind of tasks, including those which may be handled readily by the ASL code as well.

Referring to FIG. 1, ACPI table 118 is a collection of registers. The status registers are software readable by ACPI driver 110. These are also hardware readable in the context that the hardware can read the status bit in order to determine whether to generate a SMI. The base address of the task register and the lengths of the task blocks are all defined in ACPI table 118. In accordance with the ACPI specification, between zero and 255 task inputs can be implemented. The task status register, containing the task status bits, thus allows 255 tasks (i.e., status register values).

Upon receiving a task that is identified as handled using ASL capabilities, a SCI arbiter accesses ACPI driver 110, which either passes control to an ACPI-aware driver, or uses a manufacturer-supplied control method or device driver 112, to handle the task. ACPI driver 110 determines which status bit, among the status bits in the task register, is asserted. As indicated above, each status bit, and its corresponding enable bit, is hard-wired and dedicated to receive a particular task. The selection of a control method or device driver 112 is determined by which bit received the signal indicating the task.

As shown in FIG. 2, when a complex task is encountered, the control method invokes a SMI from within ACPI code to handle operations in an optimal way (step 206). The chipset has a capability to generate an SMI based on accesses to predefined I/O address locations. The control method accesses the I/O address location that is programmed to trigger an SMI by using the chipset capability. An SMI is generated in the path of ASL code execution to enable usage of flexible native CPU instruction set within the SMI handler. A software SMI generation I/O register access is used to force an SMI occurrence within the ASL code execution path. In particular, an operation region is defined for the SMI I/O address that is being accessed. Once an operation region is defined for an I/O address, this newly defined entity can be accessed from within any of the control methods to generate an SMI.

The control method performs whatever action is appropriate for the task it handles. For example, if the task requires complex data handling and transfer, the control method acknowledges the task as one handled by a SMI handler. Thus, when ACPI driver 110 detects the assertion of an enable bit of the task register, it calls the appropriate driver 112 according to the particular task register pin asserted and according to ACPI table 118. If the task register pin and table 118 indicate that the task should be handled by SMM code, an SMI is generated within the ACPI code and the SMI handler handles the task. The operating system sets the SMI enable bit for the device in the SMI generation I/O register when a complex task is detected.

The SMI handler then processes the complex task (step 208). Embodiments of the present invention thus identify and redirect complicated tasks in the ACPI ASL code to the SMM. In this manner, some or all of the complicated tasks handled by the ACPI ASL code are instead handled by the SMM. In particular, once an SMI is invoked, the processor stops and processes the SMI. An SMI handler is given control for the various processors at different address locations. Each processor SMI handler starts executing its code once it has been invoked. The SMI handler code gets various tasks that have to be executed through the I/O address contents. In this regard, the SMI handler takes the appropriate code path to handle complicated tasks for which it has been invoked. The data can be easily gathered from within the SMI handler code instead of writing complex ACPI ASL code. By allowing the SMI handler to handle complicated tasks, the difficulties associated with using ACPI ASL code is minimized. The same data transfer can now occur faster during runtime OS execution by using the processor's powerful instruction set capability and in some cases having multiple processors being available for data processing allows for good delegation of tasks between the processing power that is available on the platform.

SMM is invoked by generating a SMI signal to processor. Processor, in response, asserts the SMI control signal that accesses a SMRAM region. The current processor state (i.e. context) is stored in extended SMRAM after assertion of the SMI signal and processor then jumps to a location in SMRAM to execute the extended SMI handler code for the complex task.

Upon completion of the complex task, the SMI handler executes a resume (RSM) instruction that restores processor's context from SMRAM, de-asserts the SMI signal, and then returns control to the control method under ACPI ASL code (steps 206, 204 and 202).

Figure 3:
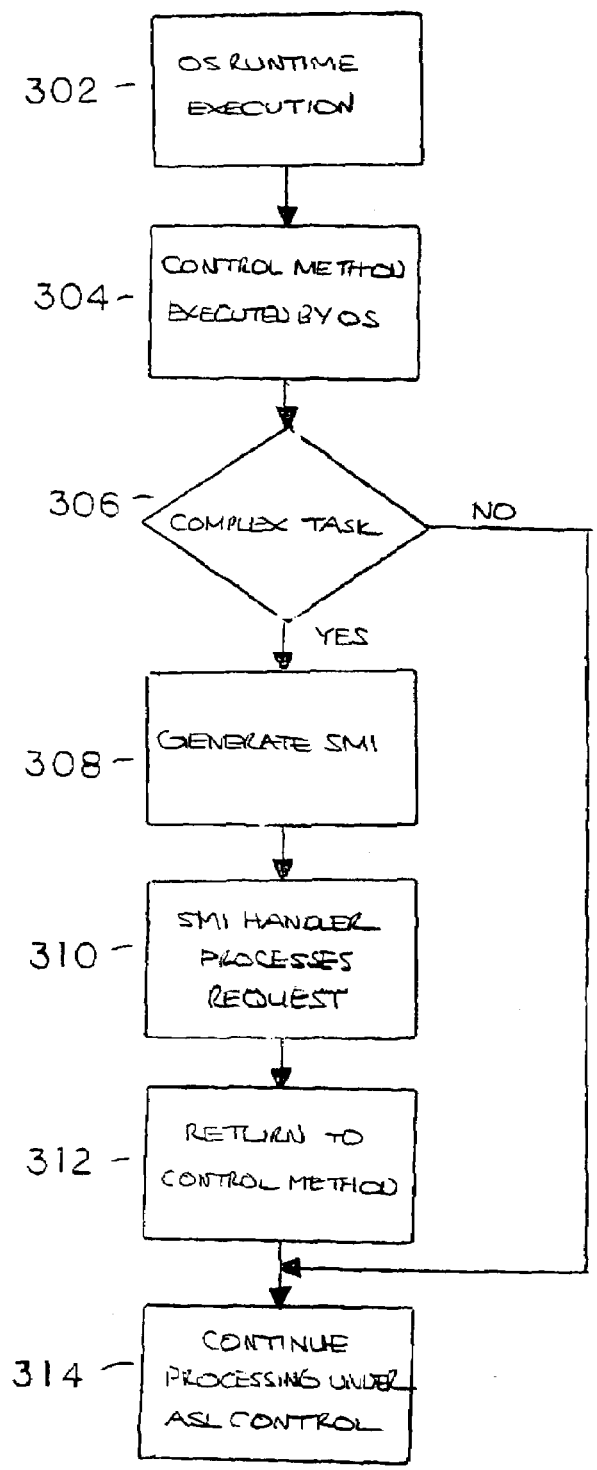
FIG. 3 illustrates a flow diagram of an embodiment of a process for enabling a control method executed by the operating system under ACPI control to handle tasks, including complex tasks.

FIG. 3 illustrates a flow diagram of an embodiment 300 of a process for enabling a control method executed by the operating system under ACPI control to handle tasks, including complex tasks. The processor along with a memory includes a software routine that, during runtime, detects the assertion of a signal on the task register bit connected to the device. The assertion of the signal on the task register bit and then determination that the task comprises a complex task suitable for execution by the SMI handler, calls the software routine. The software routine obviates the need for the ACPI ASL code to execute complex instructions more suitable for the SMI handler to execute. Enable bits are read and written by software, and indicate to the system whether a task occurrence from a particular device is to be executed by the SMI handler instead.

Under OS runtime execution (step 302), ACPI driver 110 queues control methods to handle each task (step 304).

When a complex task is encountered (step 306), the control method invokes a SMI from within ACPI code to handle operations in an optimal way (step 308). The ACPI control method accesses the I/O address location that triggers an SMI signal to the processor by using the chipset capability. A SMI is generated in the path of ASL code execution to enable usage of flexible native CPU instruction set within the SMI handler.

The SMI handler then processes the complex task (step 310). Embodiments of the present invention thus identify and redirect complicated tasks in the ACPI ASL code to the SMM.

Upon completion of the complex task, the SMI handler executes a resume (RSM) instruction that restores processor's context from SMRAM, de-asserts the SMI signal, and then returns control to the control method under ACPI ASL code (steps 312, 314).

If a complex task is not detected (step 306), then processing is continued under ASL control (step 314) and a SMI is not generated.

In accordance with another embodiment of the invention, a task occurrence from a hardware device sets a status bit, corresponding to the device status bits are set in hardware, and are read both by hardware in order to cause the SCI task occurrence. The enable bit corresponding to that status bit (and to the device) may be set as well.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A method for executing a predefined system management mode (SMM)-compatible task while operating under advanced configuration and power interface (ACPI) control, comprising:
   generating a system management interrupt (SMI) request under ACPI control by detecting the predefined SMM-compatible task under ACPI control and configuring a processor to access a SMI driver upon detecting the predefined SMM-compatible task;
   changing an operation mode of the processor to the SMM in response to the SMI request; and
   executing a resume ACPI control process to return the processor to ACPI control after the predefined SMM-compatible task is complete.

2. The method according to claim 1, wherein changing the operation mode of a processor to the SMM further comprises:
   saving processor state map information in a first area of a memory upon reception of the SMI request.

3. The method of claim 1, wherein generating a SMI request under ACPI control further comprises:
   setting SMI enable in a SMI generation register.

4. The method of claim 1, wherein configuring the processor to access the SMI driver upon detecting the predefined SMM-compatible task comprises:
   using a SMI generation register for generating the SMI request during operation of an operating system under ACPI control in response to detection of the predefined SMM-compatible task.

5. The method of claim 1, wherein a SMI generation register is configured to generate an SMI signal in response to recognition of the predefined SMM-compatible task.

6. A method for executing a predefined system management mode (SMM)-compatible task under advanced configuration and power interface (ACPI) control, comprising:
   generating a system management interrupt (SMI) request during operation of an operating system under ACPI control by detecting the predefined SMM-compatible task under ACPI control and configuring a processor to access a SMI driver upon detecting the predefined SMM-compatible task;
   changing a mode of the processor to SMM in response to the SMI request;
   executing tasks by the processor in the SMM mode;
   delegating tasks to various processors to achieve faster execution in SMM mode; and
   returning the processor to ACPI control after the predefined SMM-compatible task is complete.

7. The method of claim 6, wherein generating a SMI request under ACPI control further comprises: setting SMI enable in a SMI generation register.

8. The method of claim 6, wherein changing a mode of a processor to SMM in response to the SMI request further comprises:
   saving processor state map information in an area of memory upon reception of the SMI request, and changing the mode of the processor to the SMM.

9. The method of claim 6, wherein configuring the processor to access the SMI driver upon detecting the predefined SMM-compatible task comprising:
   using a SMI generation register for generating the SMI request during operation of an operating system under ACPI control in response to detection of the predefined SMM-compatible task.

10. The method of claim 6, wherein a SMI gereration register is configured to generate an SMI signal in response to recognition of the predefined SMM-compatible task.

11. A machine readable medium having stored therein a plurality of machine readable instructions executable by a processor to execute a predefined system management mode (SMM)-compatible task in SMM while under advanced configuration and power interface (ACPI) control, comprising:
   instructions to generate a system management interrupt (SMI) request during operation of an operating system under ACPI control by detecting the predefined SMM-compatible task under ACPI control and configuring the processer to access a SMI driver upon detecting the predefined SMM-compatible task;
   instructions to change a mode of the processor to SMM in response to the SMI request;
   instructions to execute tasks by the processor in the SMM mode; and instructions to return the processor to ACPI control after the predefined SMM-compatible task is complete.

12. The machine readable medium of claim 11, wherein instructions to generate a SMI request during operation of an operating system under ACPI control further comprises:
   instructions to set SMI enable in a SMI generation register.

13. The machine readable medium of claim 11, wherein instruction to change a mode of a processor to SMM in response to the SMI request further comprises:
   instructions to save processor state map information in an area of memory upon reception of the SMI request, and changing the mode of said processor to the SMM.

14. The machine readable medium of claim 11, wherein instructions to configure the processor to access the SMI driver upon detecting the predefined SMM-compatible task further comprises:
   instructions to generate the SMI request during operation of an operating system under ACPI control in response to detection of the predefined SMM-compatible task.

15. The machine readable medium of claim 11, further comprising:
   instructions to configure a SMI register to generate a SMI signal in response to recognition of the predefined SMM-compatible task.

* * * * *